Patented May 14, 1935

2,001,171

UNITED STATES PATENT OFFICE 2,001,171

PROCESS OF PREPARING ACETIC ACID FROM ACETALDEHYDE

Karl Weibezahn and Felix Walter, Knapsack, near Cologne-on-the-Rhine, Germany, assignors to Aktiengesellschaft fur Stickstoffdunger, Knapsack, near Cologne-on-the-Rhine, Germany No Drawing. Application September 30, 1933, Serial No. 691,691. In Germany October 11, 1932

7 Claims. (Cl. 260—116)

The present invention relates to a new process of preparing acetic acid from acetaldehyde.

We have found that the well-known process of preparing acetic acid from acetaldehyde by causing oxygen or oxygen containing gases to react upon acetaldehyde dissolved in acetic acid or another solvent for acetaldehyde and acetic acid can be considerably improved as to a better yield and a better reaction velocity if the reaction is performed in the presence of ozone and a temperature above 0° C.

As is stated above the reaction temperature must be kept above 0° C., and it is pointed out that an exact upper limit cannot be given. However, the temperature is preferably not allowed to rise over the boiling point of acetic acid which obviously depends on the working pressure.

The acetic acid obtained according to our present invention is distinguished by its high degree of purity; it does not leave behind any solid residues if evaporated and can, therefore, directly be used for most purposes without the necessity of purifying or rectifying it. The amount of percompounds formed during the reaction is so small that no danger of explosions will arise. Moreover, percompounds, if formed, are converted into acetic acid by the action of the acetaldehyde without giving rise to the formation of a considerable amount of gaseous decomposition products.

The reaction can be performed in the presence of acetic acid as well as in any other solvent for acetaldehyde and acetic acid which does not chemically react with the oxidizing gases or with acetic acid and acetaldehyde.

If the reaction is performed in the presence of acetic acid as solvent care must be taken that acetic acid is continuously removed from the reaction vessel in the same degree as it is formed. The acetic acid thus removed is freed from acetaldehyde dissolved therein which upon condensation is led back into the reaction vessel together with volatile liquids if solvents other than acetic acid and of a lower boiling point than acetic acid are used.

The oxidizing gases which are preferably finely distributed by means of sieve plates, porous filters or in any other way can simultaneously serve for thoroughly mixing the reaction liquid. The mixing of the liquid can likewise be effected by mechanical means.

The removal of the heat of reaction and the maintenance of the desired temperature can be effected in known manner by external or internal cooling devices, if desired, by subjecting the reaction liquid or only part of it to the cooling process and leading it back to the reaction chamber. Another method for maintaining the desired reaction temperature resides in the use of a solvent, the boiling point of which coincides with the said temperature. Acetaldehyde itself can be used as such a solvent.

The reaction mixture can be caused to circulate solely by the action of the oxidizing gases entering the bottom of the chamber in a finely divided form. In this method of performing the reaction the circulating liquid leaves the reaction vessel by way of an overflow, enters a cooler and is led back into the bottom part of the chamber. The necessary flow of the liquid is effected solely by the difference between the specific weight of the liquid in the reaction chamber and that of the liquid in the cooler, the lower specific weight of the former being due to the higher temperature and to the presence of the finely divided oxidizing gases. The flow of liquid can be regulated in known manner, and can, of course, be effected likewise by any other mechanical means.

The reaction liquid can be prevented from flowing back into the pipe for the oxidizing gases by a check valve or a similar device. The ozone may be produced directly in the oxidizing gases or it may be previously prepared and led into the chamber dissolved in acetic acid, if desired, simultaneously with the oxidizing gases.

The amount of the ozone to be used for effecting the best activation of the oxygen depends on the working conditions. However, when working in technical scale, one will use the ozone in an amount considerably smaller than the optimum amount.

The ozone is completely consumed in the course of the reaction and it is evident therefrom that if air is used as oxidizing gas, there is obtained as waste product a gas which upon elimination of small traces of solvent, of acetic acid and acetaldehyde, consists substantially of nitrogen and we wish to point out that our present invention concerns likewise a process of preparing pure nitrogen. In order to cause the separation of the small amounts of the reaction components and the solvent which are carried along, the nitrogen may be used for driving a pressed gas pump known as a "mammoth pump" and thus for conveying liquids for washing out the nitrogen.

Although the chief factor of our present invention resides in the use of ozone, we wish to point out that, nevertheless, the well-known solid catalysts, such as compounds of manganese uranium, lead, iron, chromium, vanadium or combinations thereof can be used simultaneously with the use of ozone. It is known that the said solid catalysts effect a considerable increase of the speed of reaction and it is a surprising fact that the reaction velocity is still more increased by the use of ozone according to our present invention. Moreover, the yield of acetic acid, calculated upon the acetaldehyde, becomes nearly quantitative (about 99.6%) if ozone is used as a catalyst. Moreover, the formation of the higher degree of valence of the solid catalysts which is decisive for the absorption of oxygen and the setting in of the reaction is considerably accelerated by the presence of ozone.

Our new process can be performed in any suitable apparatus. Reaction towers as well as columns filled with fillers, shaking apparatus and stirring apparatus can be used. The apparatus can be subdivided into several sections. The process can be carried out in a direct current, i. e. by causing the solvent, the acetic acid and the acetaldehyde to enter the reaction chamber at the bottom, or in counter current. The acetaldehyde can be introduced either in a pure state, or dissolved in a suitable solvent.

The following examples serve to illustrate the invention, but they are not intended to limit it thereto, the parts being by weight. It is to be understood that only small changes are necessary for performing the process in a discontinuous manner.

(1) A tower provided with a sieve plate at the bottom is filled with 3000 parts of crude acetic acid containing 60 parts of acetaldehyde, the temperature being about 58° C. Through the sieve plate there are introduced every hour about 236 parts of ozonized air with an ozone content of 0.5 per cent by weight, the pressure being about 3 to 6 atmospheres. The liquid content of the tower flows over into a cooler and the acetic acid which has passed the tower is loaded with 150 parts of acetaldehyde every hour and reintroduced into the tower at a place above the sieve plate. The circulation of the reaction liquid is regulated in such a manner that the initial temperature of about 58° C. in the tower is maintained. A second overflow is arranged just above the first overflow which serves for removing continuously acetic acid in the same degree as it is formed in the tower. The acetic acid removed from the tower is led into a heated vessel provided with a column wherein it is freed from small traces of acetaldehyde which is reconducted into the acetaldehyde pipe. The acetic acid thus obtained is as bright as water and has a strength of about 99.0%.

When strictly observing the above conditions, there escapes at the top part of the tower a waste gas consisting substantially of nitrogen with small traces of acetic acid and acetaldehyde, which are removed by washing the gases in a trickling tower with cold acetic acid. The acetic acid used for this purpose is derived from the cooler for the circulating acetic acid and after having passed the trickling tower and having been loaded with acetaldehyde, it is led over a siphon to a reservoir, wherefrom it is reconducted into the process. The last traces of acetaldehyde contained in the nitrogen are condensed in a cooler and led back into the reaction tower. The nitrogen thus obtained contains only very small traces of oxygen and no ozone. The yield of acetic acid is about 99%.

(2) An apparatus similar to that described in Example 1 is used, the trickling tower being dispensed with. The tower which is likewise provided with a sieve plate at the bottom is filled with 3000 parts of crude acetic acid of a temperature of about 50° C. which contains 60 parts of acetaldehyde. The overflow at the top part of the tower leads over a cooler to a pump which introduces continuously 180 parts of acetaldehyde every hour and effects a thorough mixing of the acetaldehyde with the acetic acid. This mixture enters the lower part of the tower just above the sieve plate where it meets every hour 65.5 parts of ozonized oxygen of an ozone content of 2.7% by weight. In order to ensure a complete absorption of the oxygen and ozone without the necessity of enlarging the tower it is advisable to work at a pressure of about 2 to 4 atmospheres. The circulation of acetic acid is controlled so that the temperature in the tower is maintained at about 50° C. Acetic acid is continuously removed from the system and purified as described in Example 1. There is obtained a yield of acetic acid of about 99%, the per cent content of acetic acid being 99%.

Above the tower there is a cooler for condensing the last traces of acetaldehyde which are reconducted into the system. There is obtained only a small amount of waste gases consisting of carbon dioxide and carbon monoxide.

(3) In an apparatus similar to that described in Example 2 there is used instead of the reaction tower a vessel which is provided with a well-acting rapid-stirrer and in the lower part with a finely perforated plate for distributing the oxidizing gases. Besides, the vessel is provided with sockets for the circulation of the acetic acid, for measuring the temperatures and possesses a gas delivery tube with a cooler. In the reaction vessel, there are introduced 3000 parts of acetic acid in which 3 parts of manganese acetate are dissolved and the solution is heated to 40° C. The acetic acid is caused to circulate over a cooler by means of a pump. After the circulating acetic acid has left the cooler, 150 parts of acetaldehyde and 0.2 part of manganese acetate in concentrated aqueous or acetic acid solution are continuously added per hour so that by means of the pump the circulating acetic acid is thoroughly mixed with the said substances added. 54.5 parts of ozonized oxygen which contain 1 g. of ozone per 100 g. of oxygen enter continuously per hour through the perforated plate into the reaction vessel, and after a very short time the reaction liquid begins to assume a brown coloration. The latter which is caused by the formation of manganese compounds of a high valence deepens very rapidly pari passu with the absorption of the oxidizing gases. The circulation of the liquid is regulated so that the temperature in the reaction vessel is 40° C. The traces of acetaldehyde which possibly remain in the dissolved condition in the acetic acid flowing off into the heating still may be recovered and reconducted into the reaction vessel. If the reaction liquid is well stirred and sufficiently pure oxygen is used, the oxidizing gases are completely consumed, so that practically no waste gases are produced.

The oxidation takes place under usual atmospheric pressure. The yield amounts to 99.6%, acetic acid of about 99 per cent strength being obtained.

We claim:
1. The process which comprises reacting with oxygen and ozone upon acetaldehyde in the pres- ence of a solvent for acetic acid and acetaldehyde at a temperature above 0° C.

2. The process which comprises reacting with oxygen and ozone upon acetaldehyde dissolved in acetic acid at a temperature above 0° C.

3. The process which comprises reacting with oxygen and ozone upon acetaldehyde in the presence of a solvent for acetic acid and acetaldehyde at a temperature above 0° C., while adding a solid catalyst known to promote the oxidation of acetaldehyde.

4. The process which comprises reacting with oxygen and ozone upon acetaldehyde dissolved in acetic acid at a temperature above 0° C., while adding a solid catalyst known to promote the oxidation of acetaldehyde.

5. The process which comprises reacting with oxygen and ozone upon acetaldehyde in the presence of a solvent for acetic acid and acetaldehyde at a temperature above 0° C., while applying pressure.

6. The process which comprises reacting with oxygen and ozone upon acetaldehyde in the presence of a solvent for acetic acid and acetaldehyde at a temperature above 0° C., while causing the reaction liquid to circulate so as to remove the heat of reaction.

7. The process which comprises reacting with air and ozone upon acetaldehyde in the presence of a solvent for acetic acid and acetaldehyde at a temperature above 0° C., while causing the oxygen content of the air to be completely absorbed so as to obtain a waste gas consisting substantially of nitrogen.

KARL WEIBEZAHN.
FELIX WALTER.